United States Patent
Nakasima et al.

(10) Patent No.: US 9,190,215 B2
(45) Date of Patent: Nov. 17, 2015

(54) ELECTROLYTIC CAPACITOR AND METHOD OF MANUFACTURING THE SAME

(71) Applicant: FUJITSU LIMITED, Kawasaki-shi, Kanagawa (JP)

(72) Inventors: Tomokazu Nakasima, Kawasaki (JP); Masayuki Itoh, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 175 days.

(21) Appl. No.: 14/026,096

(22) Filed: Sep. 13, 2013

(65) Prior Publication Data

US 2014/0085775 A1   Mar. 27, 2014

(30) Foreign Application Priority Data

Sep. 24, 2012   (JP) .................................. 2012-209645

(51) Int. Cl.
  *H01G 9/028*  (2006.01)
  *H01G 9/004*  (2006.01)
  *H01G 9/00*   (2006.01)
  *H01G 9/008*  (2006.01)
  *H01G 9/10*   (2006.01)

(52) U.S. Cl.
  CPC .............. *H01G 9/004* (2013.01); *H01G 9/008* (2013.01); *H01G 9/0029* (2013.01); *H01G 9/10* (2013.01); *Y10T 29/417* (2015.01)

(58) Field of Classification Search
  USPC ......... 361/525, 516–519, 523, 528–529, 530, 361/535, 537, 540, 503–504
  See application file for complete search history.

(56) References Cited

U.S. PATENT DOCUMENTS

| 3,969,334 A | * | 7/1976 | Shimizu et al. | 528/488 |
| 6,052,273 A | * | 4/2000 | Inoue et al. | 361/523 |
| 2008/0190647 A1 | | 8/2008 | Itoh | |

FOREIGN PATENT DOCUMENTS

| JP | 2002-010567 A | 1/2002 |
| JP | 2003-272963 A | 9/2003 |
| JP | 2007-067146 A | 3/2007 |
| JP | 2008-108865 A | 5/2008 |
| JP | 2008-130782 A | 6/2008 |
| JP | 2008-235322 A | 10/2008 |
| JP | 2009-212175 A | 9/2009 |
| JP | 2010-003811 A | 1/2010 |
| JP | 2010-153712 A | 7/2010 |
| JP | 2010-153713 A | 7/2010 |
| JP | 2010-161277 A | 7/2010 |
| WO | WO 2007/043181 A1 | 4/2007 |

* cited by examiner

*Primary Examiner* — Nguyen T Ha
(74) *Attorney, Agent, or Firm* — Squire Patton Boggs (US) LLP

(57) ABSTRACT

There is provided an electrolytic capacitor which includes a capacitance portion that includes an anode and a cathode foils wound around, a separator being provided between the foils, a first conductor bar connected to the anode foil, a second conductor bar to the cathode foil, a casing that houses the capacitance portion, the first conductor bar, and the second conductor bar and is provided with an opening, a sealing material fitted to the opening, the sealing material including a first and a second holes, a first lead welded to the first conductor bar within the first hole, a second lead to the second conductor bar the second holed, a first insulating filler filled between the first hole and the first lead and filler being formed in a porous state, and a second insulating filler filled between the second hole and the second lead and being formed in a porous state.

10 Claims, 10 Drawing Sheets

ELECTROLYTIC CAPACITOR AND METHOD OF MANUFACTURING THE SAME

CROSS-REFERENCE TO RELATED APPLICATION

This application is based upon and claims the benefit of priority of the prior Japanese Patent Application No. 2012-209645, filed on Sep. 24, 2012, the entire contents of which are incorporated herein by reference.

FIELD

The embodiments discussed herein are related to an electrolytic capacitor and a method of manufacturing the same.

BACKGROUND

There are various types of capacitor used in electronics. Among all, aluminum electrolytic capacitors are preferred to be connected to a power line of a semiconductor device, such as a central processing unit (CPU) and large scale integration (LSI), taking advantage of the high capacity and to be implemented in an on-board substrate as a capacitor for compensation for momentary voltage drop.

Such an aluminum electrolytic capacitor is fabricated by rolling separators into an anode foil and a cathode foil that have aluminum as a material and connecting conductor bars for electrically drawing each electrode to outside to the anode foil and the cathode foil, respectively. In order to avoid creating contact potential difference against the anode foil or the cathode foil, it is preferred to use aluminum for a material of the conductor bars that is a material same as the material of the anode foil and the cathode foil.

Then, an end of such conductor bar is connected to a lead for implementation of the aluminum electrolytic capacitor in a circuit board. As the lead, in order to electrically connect the aluminum electrolytic capacitor to the circuit board in a good condition, a copper wire or a copper-clad steel wire with low electrical resistance is used. The aluminum electrolytic capacitor is soldered to the circuit board while, for good solder wettability, the surface of the copper wire is covered with a tin layer in advance.

Here, to connect the leads to the above conductor bars, electric welding that is easy to connect is used. Upon such electric welding, the tin layer on the surface of the lead is melted to be reattached to the surface of the welded portion and thus a tin layer of uncertain thickness is formed in the welded portion of the lead and the conductor bar. Mechanical stress is inherent in the tin layer, and it is understood that a plating whisker, called as a whisker, grows on the surface of the tin layer caused by the stress.

Examples of related art are Japanese Laid-open Patent Publication Nos. 2003-272963, 2007-67146, 2008-130782, 2008-108865, 2009-212175, 2010-153712, 2010-153713, 2010-161277, 2008-235322, and 2010-3811 and International Publication Pamphlet No. WO 2007/043181.

SUMMARY

According to an aspect of the invention, an electrolytic capacitor includes a capacitance portion that includes an anode foil and a cathode foil wound around, a separator being provided between the anode foil and the cathode foil, a first conductor bar connected to the anode foil, a second conductor bar connected to the cathode foil, a casing that houses the capacitance portion, the first conductor bar, and the second conductor bar and is provided with an opening, a sealing material fitted to the opening, the sealing material including a first hole and a second hole, a first lead welded to the first conductor bar within the first hole; a second lead welded to the second conductor bar the second holed, a first insulating filler filled between the first hole and the first lead, the first insulating filler being formed in a porous state, and a second insulating filler filled between the second hole and the second lead, the second insulating filler being formed in a porous state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preliminary Consideration

Figure 1:
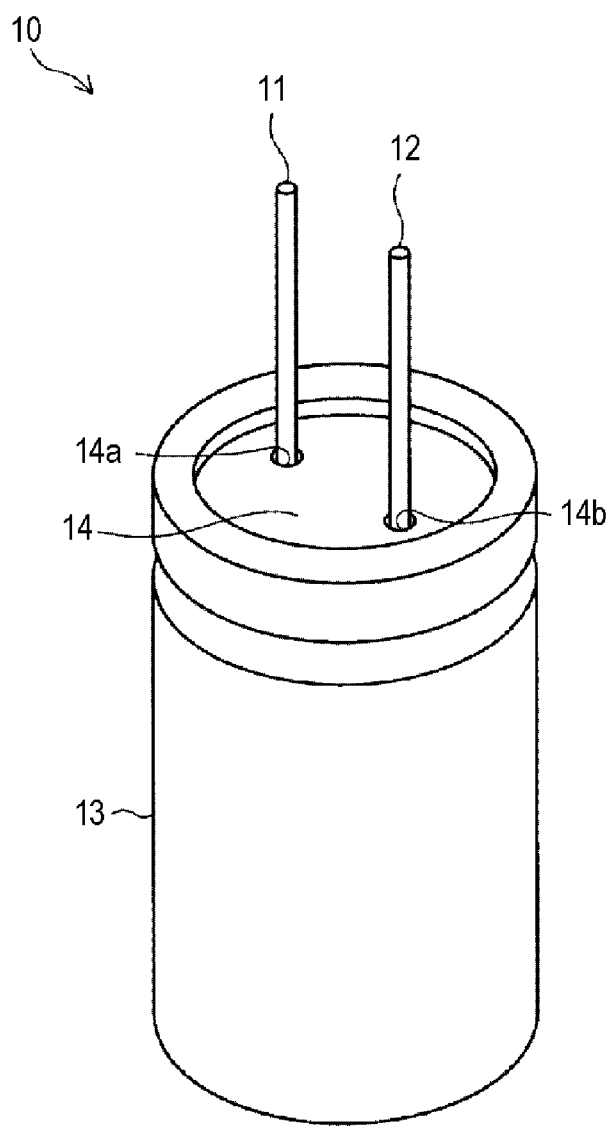
FIG. 1 is a perspective view of an electrolytic capacitor according to an embodiment.

The whisker is linear crystal of tin and has conductivity. Therefore, as the whisker is separated from the surface of the welded portion to be attached onto the circuit board, there is a risk that terminals of electronic components on the circuit board are electrically short-circuited with each other by the whisker and that a failure occurs in the circuit.

In order to avoid attachment of a whisker to a circuit board, various methods are proposed while all have room for improvement.

For example, there is proposed a method of avoiding separation of a whisker from a welded portion by covering the welded portion where the whisker is generated with a thermosetting resin. However, this has a risk that material components of the thermosetting resin are dissolved in the internal electrolyte solution of the aluminum electrolytic capacitor and electrical properties, durability performance, and the like of the aluminum electrolytic capacitor are deteriorated to deviate from the design values. Further, in this method, there also have to be excessive manhours for covering the welded portion with the thermosetting resin, which turns out to make the process of manufacturing an aluminum electrolytic capacitor complex.

In addition, there is also proposed a method of inhibiting generation of whiskers by washing the leads with an alkaline solution or heating the leads before electric welding while there is no guarantee that this method completely inhibits the generation of whiskers.

Further, there is also proposed a method of not allowing a whisker, by blocking an opening of a cylindrical casing that houses the cathode foil and the anode foil with a sealing material and also working out the shape of hole equipped in the sealing material to let the leads go through, to pass through the hole. Although this method enables to inhibit scattering of whiskers on the circuit board because the whiskers are blocked at the hole, it is not suitable for mass production because the sealing material having a hole in a special shape is custom made, which is not widely spread in general.

Then, there is also proposed a method of avoiding a whisker from falling on a circuit board, by sandwiching a sheet made of silicone rubber between an open end of the cylindrical casing and the circuit board, with the sheet. However, in a case that the open end of the cylindrical casing is not parallel to the main surface of the circuit board, it is not possible to sandwich the sheet between the cylindrical casing and the circuit board, so that this method is not capable of handling all implementation structures of aluminum electrolytic capacitor.

Other than those, there are proposed methods of partially removing the tin layer of the leads and of equipping an enlarged portion in the leads to avoid whiskers from falling on the circuit board while all methods turn out to lead an increase in a number of procedures.

It is desired to avoid a whisker from scattering in an electrolytic capacitor and a method of manufacturing the same.

Embodiment

Descriptions are given below to an electrolytic capacitor according to the embodiment with reference to the drawings.

FIG. 1 is a perspective view of an electrolytic capacitor according to an embodiment.

Such an electrolytic capacitor 10 is an aluminum electrolytic capacitor and provided with first and second leads 11 and 12, a casing 13 made of aluminum, and a sealing material 14.

Among these, the casing 13 is in a cylindrical shape provided with an opening 13a, and the sealing material 14 is fitted to the opening 13a. Although the material for the sealing material 14 is not limited in particular, rubber, such as isobutylene isoprene rubber (IIR), is used as the material for the sealing material 14 in the embodiment.

In the sealing material 14, first and second holes 14a and 14b having a diameter from 2 mm to 3 mm, approximately, are formed and the first and second leads 11 and 12 are put through the respective holes 14a and 14b.

It is to be noted that the casing 13 has a surface covered with a sleeve while the sleeve is omitted in FIG. 1.

Figure 2:
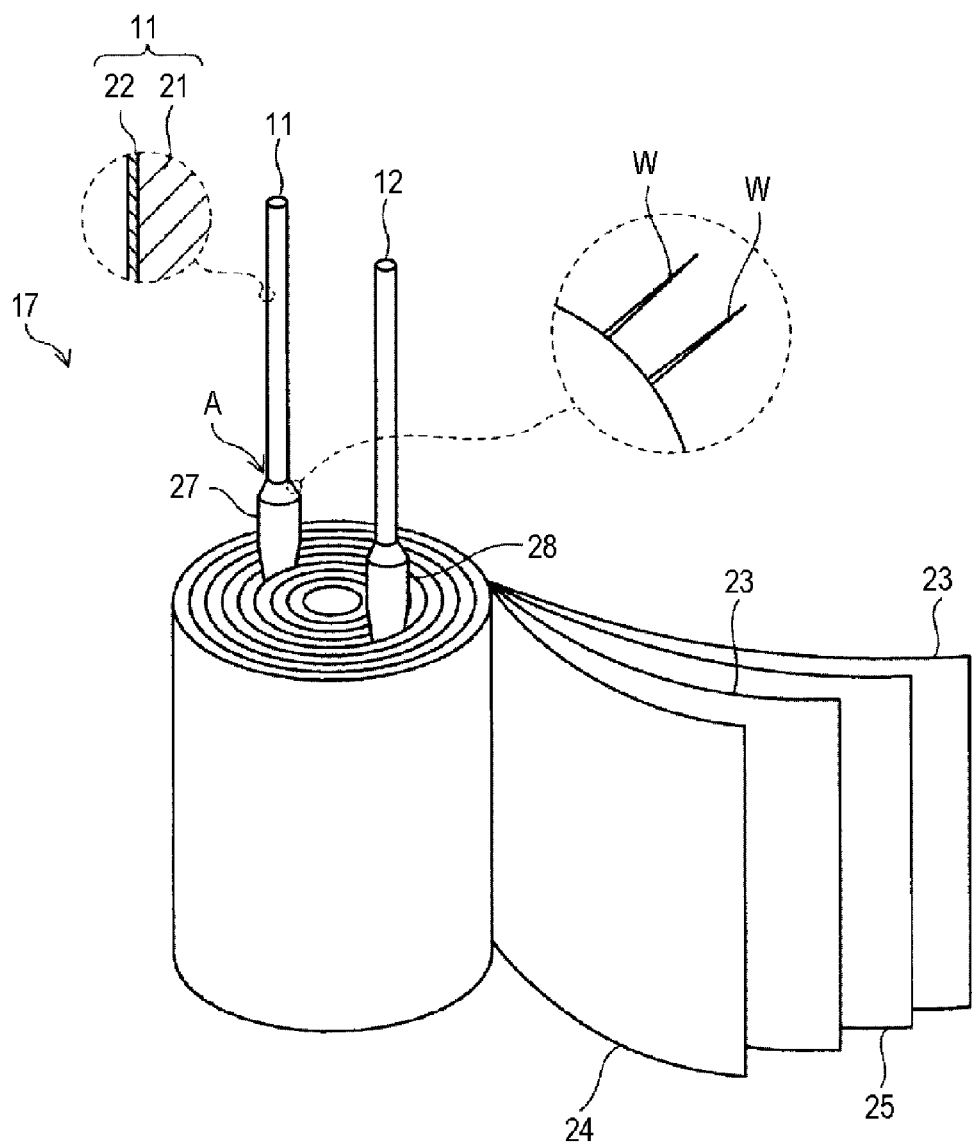
FIG. 2 is a perspective view of a capacitance portion provided in the electrolytic capacitor according to the embodiment.

FIG. 2 is a perspective view of a capacitance portion provided in the electrolytic capacitor 10.

As illustrated in FIG. 2, a capacitance portion 17 is formed by winding an anode foil 24 and a cathode foil 25 around via separators 23. Both the anode foil 24 and the cathode foil 25 are a metal foil, such as an aluminum foil, and the separators 23 are paper impregnated with an electrolyte solution that is made by dissolving an electrolyte, such as an amidine compound and ammonium salt, in a solvent, such as gammabutyrolactone and ethylene glycol.

Then, the anode foil 24 and the cathode foil 25 are connected respectively to first and second conductor bars 27 and 28 and these conductor bars 27 and 28 are connected respectively to the first and second leads 11 and 12.

The material for the first and second conductor bars 27 and 28 is not limited in particular. However, in order not to create contact potential difference against the anode foil 24 or the cathode foil 25 that has aluminum as a material, the embodiment employs aluminum that is a same material as the anode foil 24 and the cathode foil 25 as the material for the first and second conductor bars 27 and 28.

Although the diameter of the first and second conductor bars 27 and 28 is also not limited in particular, the embodiment employs from 2 mm to 3 mm, approximately, that is same as the diameter of the respective holes 14a and 14b (refer to FIG. 1) for the diameter of these conductor bars 27 and 28.

In the meanwhile, since the first and second leads 11 and 12 are the parts to be terminals upon implementation of the electrolytic capacitor 10 in the circuit board, a copper wire or a copper-clad steel wire with low electrical resistance is used as a core wire 21 thereof. Then, for good soldering wettability at the time of implementation, a low melting point metal layer 22, such as a tin layer, is formed on the surface of the core material 21.

The first and second leads 11 and 12 have a diameter from 0.6 mm to 0.8 mm, approximately, smaller than the diameter of the first and second holes 14a and 14b (refer to FIG. 1) of the sealing material 14.

For the connection of the first lead 11 and the first conductor bar 27, electric welding that is easy to connect compared with other methods is used. Similarly, the second lead 12 and the second conductor bar 28 are also connected to each other by electric welding.

As using electric welding, in such a manner, a whisker W is sometimes generated in a welded portion A of the first lead 11 and the first conductor bar 27 as already described. The whisker W is linear crystal of tin and has a length of several hundreds of μm and a diameter of several μm, approximately.

Figure 3:
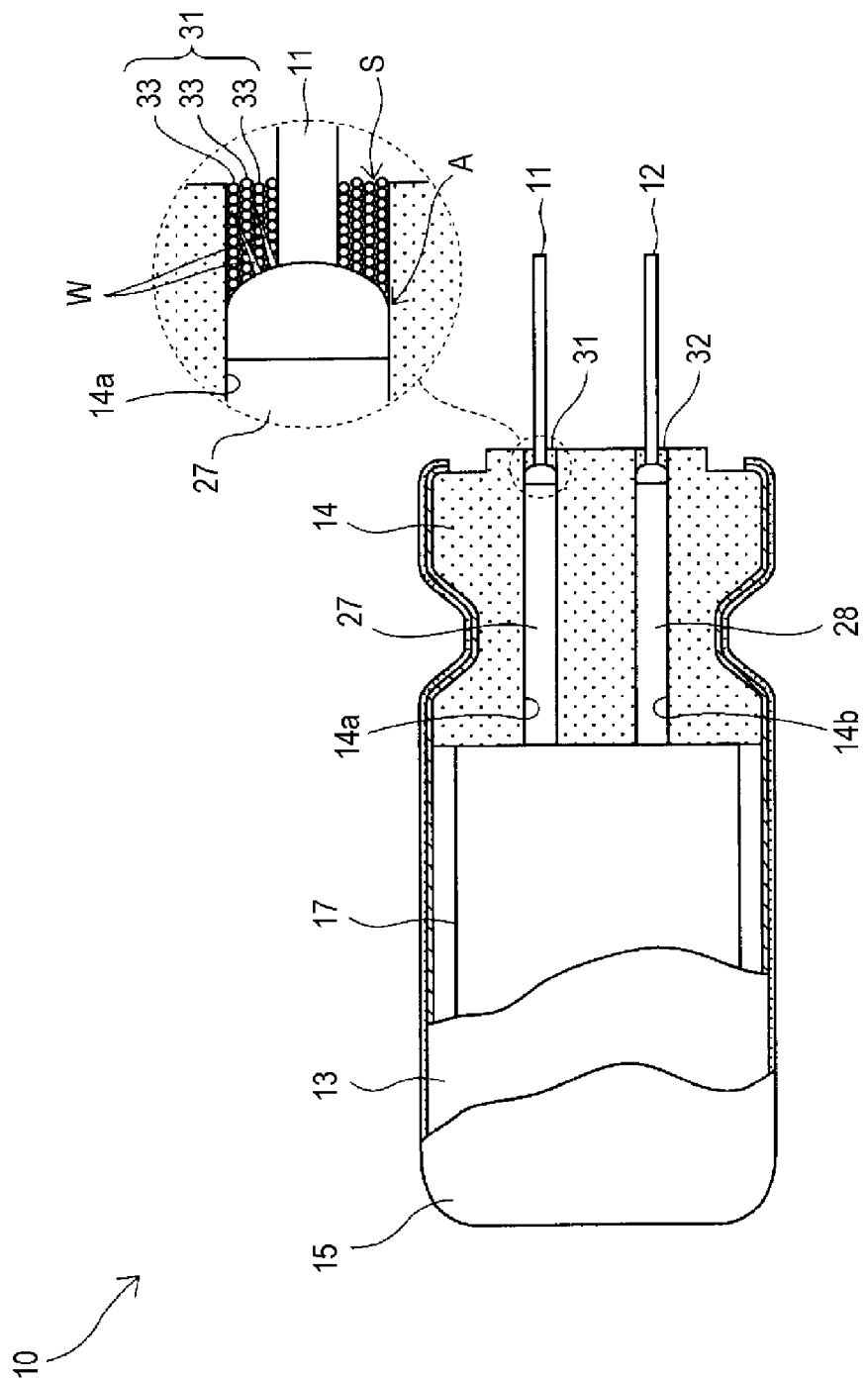
FIG. 3 is a cross-sectional view of the electrolytic capacitor according to the embodiment.

FIG. 3 is a cross-sectional view of the electrolytic capacitor 10.

As illustrated in FIG. 3, the casing 13 has a surface covered with a sleeve 15 having polyester, polyethylene terephthalate (PET), or the like as a material. Then, the casing 13 houses the capacitance portion 17 therein.

The respective first and second conductor bars 27 and 28 are put through the first and second holes 14a and 14b of the sealing material 14 and the welded portion A that is a source of generation of the whisker W is located inside these holes 14a and 14b.

Here, as the whisker W falls from the holes 14a and 14b and scatters on the circuit board, there is a risk of electrically short-circuiting other electronic components on the circuit board with each other by the conductive whisker W.

With that, in the embodiment, the respective first and second holes 14a and 14b are filled with first and second insulating fillers 31 and 32, thereby avoiding the scattering of the whisker W.

Although a shape of the first and second fillers 31 and 32 is not limited in particular, the embodiment employs an aggregate of a plurality of granules 33 for these fillers. The aggregate is filled in a gap between the first hole 14a and the first lead 11, thereby enabling to avoid scattering of the whisker W from the first hole 14a. Similarly, the aggregate is filled in a gap between the second hole 14b and the second lead 12, thereby enabling to avoid scattering of the whisker W from the second hole 14b.

The diameter of granules 33 is not limited in particular and the diameter of granules 33 may be set to the extent that the granules 33 enter into the gap between the first hole 14a and the first lead 11 and the gap between the second hole 14b and the second lead 12. For example, in a case that an interval between the first hole 14a and the first lead 11 is 0.5 mm, approximately, the granules 33 having a diameter of about 0.1 mm, approximately, that is smaller than the interval may be employed.

In order to avoid modification of the electrolyte solution with which the separators 23 (refer to FIG. 2) are impregnated due to volatile components from the sealing material 14, it is preferred to use a material, such as Isobutylene-Isoprene Rubber (IIR), containing less volatile components compared with other rubbers as the material for the sealing material 14. Further, it is preferred to inhibit modification of the electrolyte solution for the separators 23 due to the volatile components from these fillers 31 and 32 using the first and second fillers 31 and 32 that are formed with an material identical to such sealing material 14 containing less volatile components.

As the granules 33 containing inhibited volatile components in such a manner, there is an aggregate of granular rubber having IIR as a material, for example.

In particular, since granular rubber is pressed against an inner surface of the first hole 14a or the second hole 14b by elastically deforming itself, it becomes difficult to drop out of these holes 14a and 14b. Therefore, it is possible to implement the electrolytic capacitor 10 in the circuit board in an arbitrary position and there are wider selections of a structure of implementing the electrolytic capacitor 10.

Even when granular rubber drops out on the circuit board, the granular rubber is insulating so that other electronic components on the circuit board do not electrically short-circuit by granular rubber.

Moreover, since a space S is formed within the adjacent granular rubber, it also becomes possible to let out a gas generated from the capacitance portion 17 while the power is on to outside via the space S.

Next, descriptions are given to a method of manufacturing the electrolytic capacitor 10.

FIGS. 4 through 9 illustrate a method of manufacturing the electrolytic capacitor 10 according to the embodiment.

Figure 4:
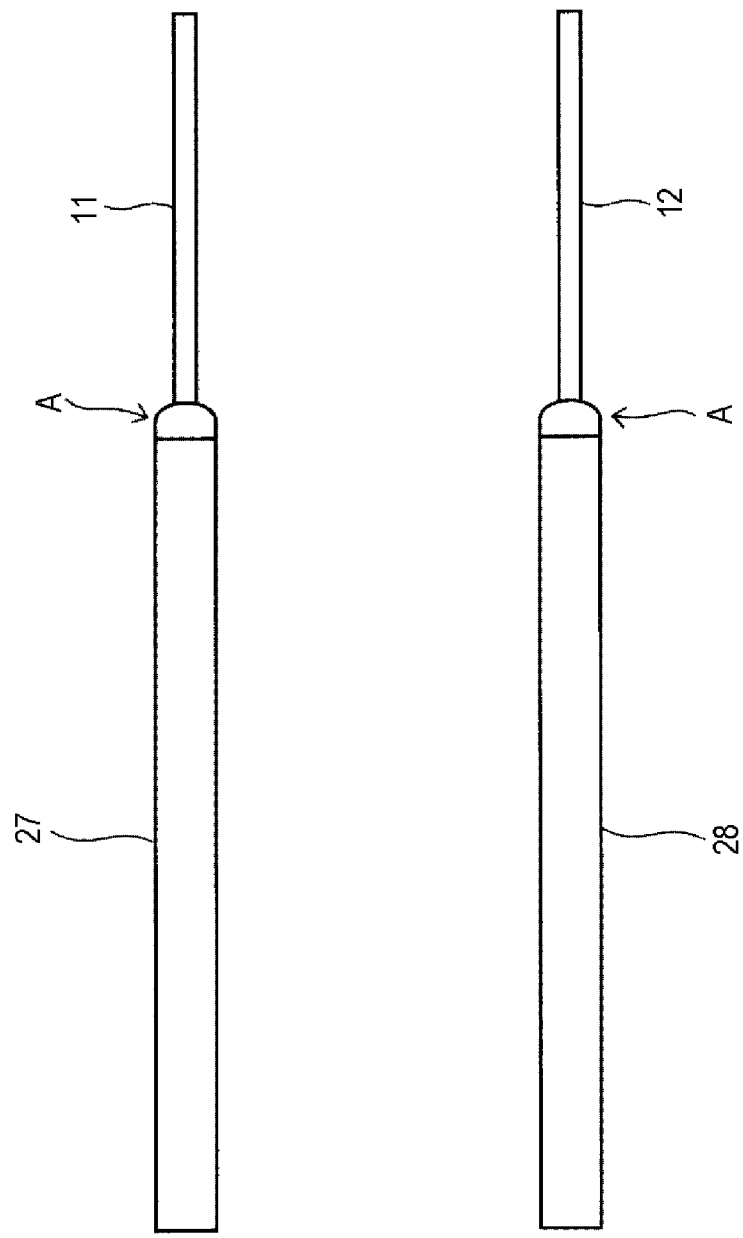
FIG. 4 is a plan view for illustration of a method of manufacturing an electrolytic capacitor according to the embodiment.

Firstly, as illustrated in the plan view of FIG. 4, the first lead 11 is connected to the first conductor bar 27 via the welded portion A by electric welding. Similarly, the second lead 12 is also connected to the second conductor bar 28 by electric welding.

Figure 5:
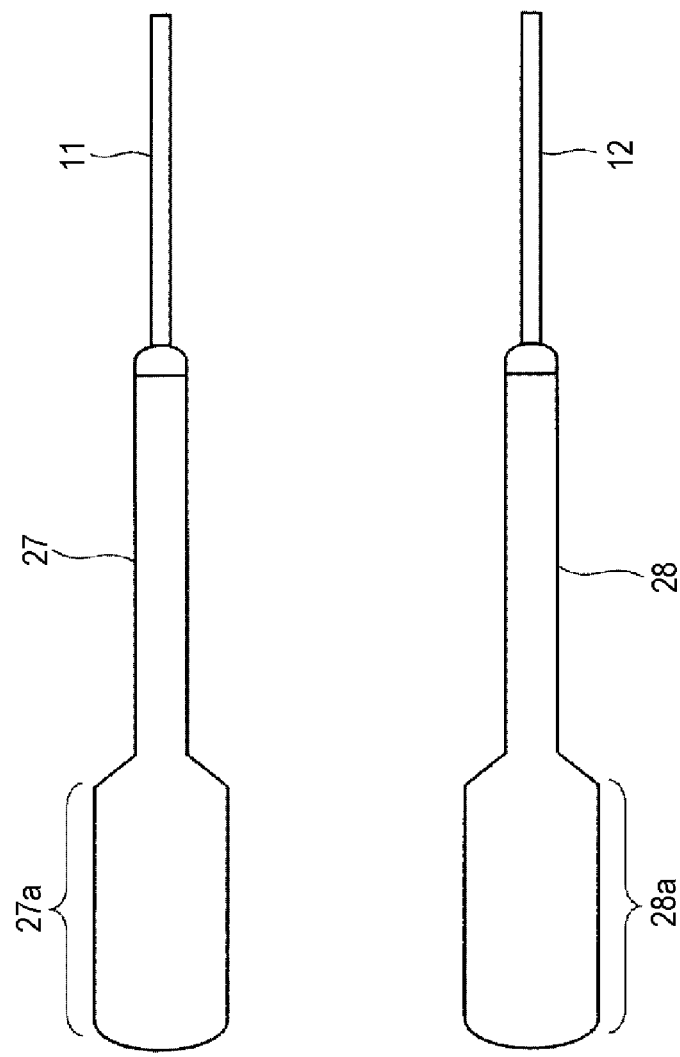
FIG. 5 is another plan view for illustration of the method of manufacturing an electrolytic capacitor according to the embodiment.

Next, as illustrated in the plan view of FIG. 5, a tip of the first conductor bar 27 is swaged, thereby forming a flat portion 27a in the first conductor bar 27. Then, in a method same as this, a flat portion 28a is formed at a tip of the second conductor bar 28 as well.

Figure 6:
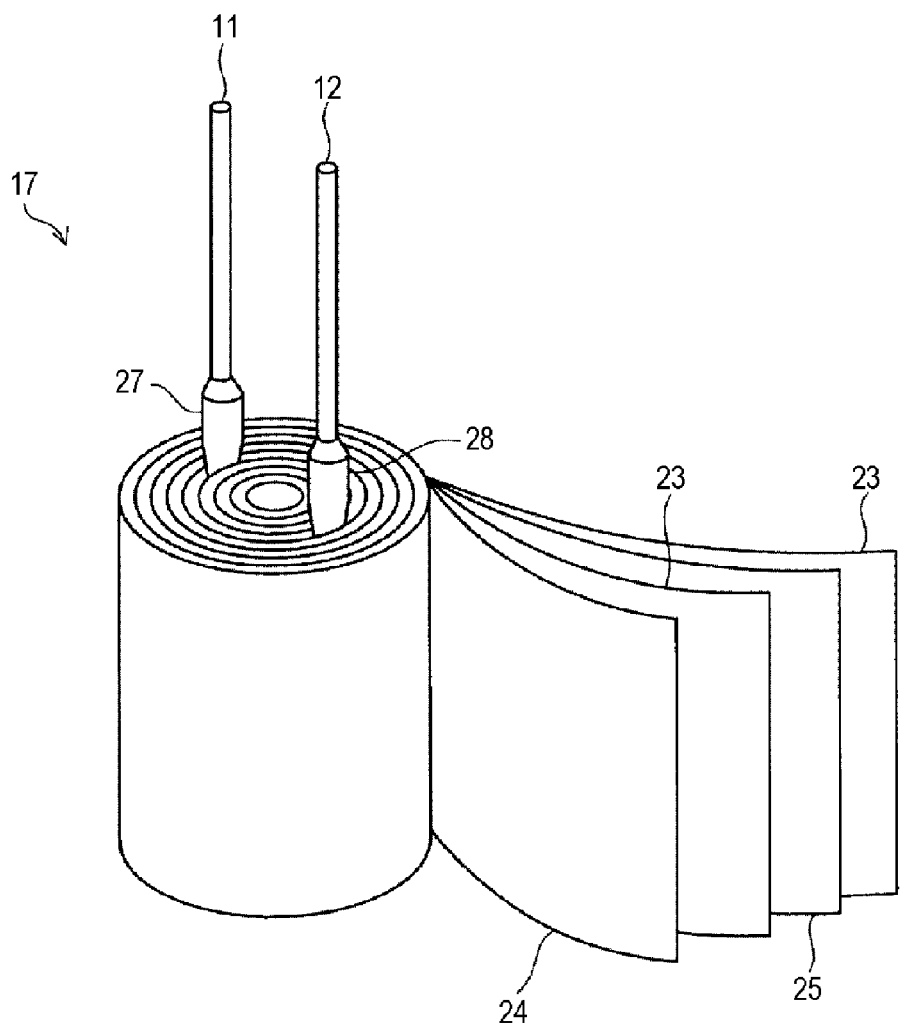
FIG. 6 is a perspective view for illustration of the method of manufacturing an electrolytic capacitor according to the embodiment.

Then, as illustrated in the perspective view of FIG. 6, the respective flat portions 27a and 28a of the first and second conductor bars 27 and 28 are mechanically fixed to the anode foil 24 and the cathode foil 25, respectively, by swaging or the like. Then, in this state, the anode foil 24 and the cathode foil 25 are wound around via the separators 23, thereby forming the capacitance portion 17.

After that, the capacitance portion 17 is impregnated with an electrolyte solution that is made by dissolving an electrolyte, such as an amidine compound and ammonium salt, in a solvent, such as gammabutyrolactone and ethylene glycol.

Figure 7:
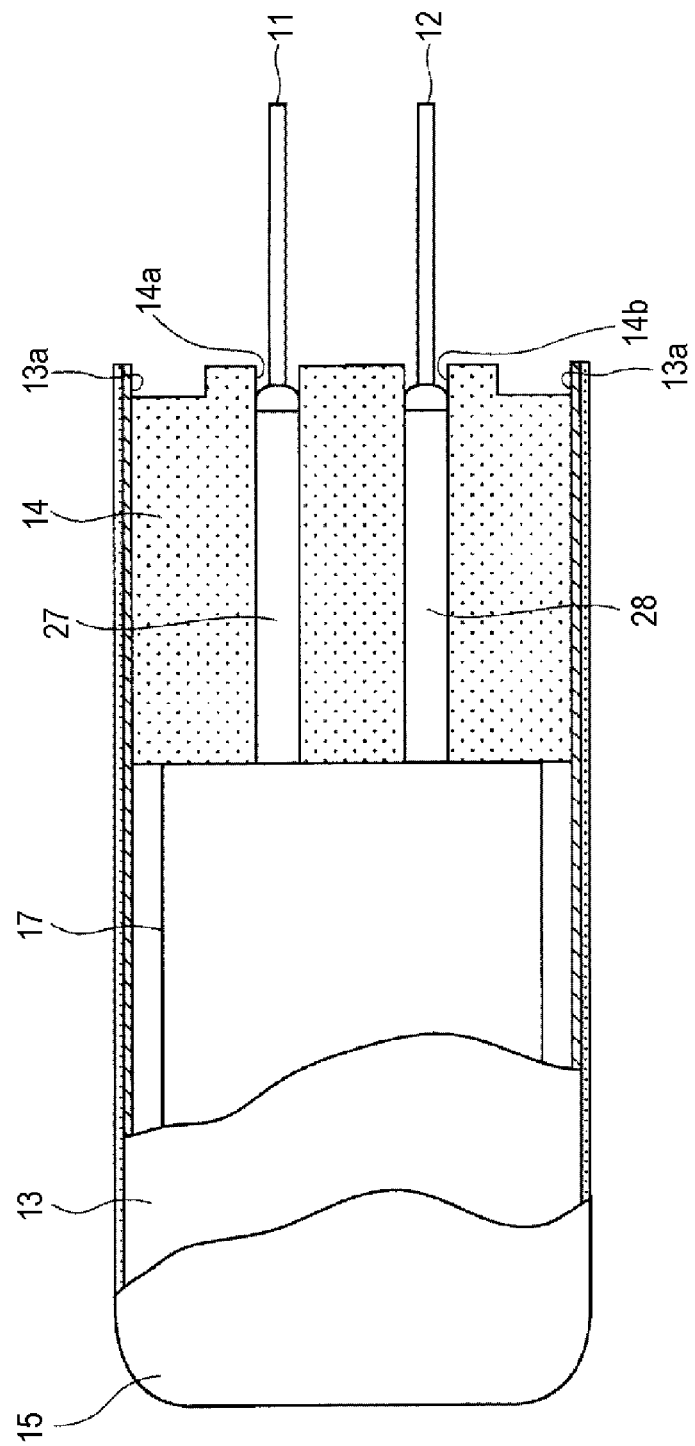
FIG. 7 is a cross-sectional view for illustration of the method of manufacturing an electrolytic capacitor according to the embodiment.

Subsequently, as illustrated in the cross-sectional view of FIG. 7, the conductor bars 27 and 28 are let through the respective holes 14a and 14b in the sealing material 14, thereby integrating the sealing material 14 with the capacitance portion 17 to be put into the aluminum casing 13.

Figure 8:
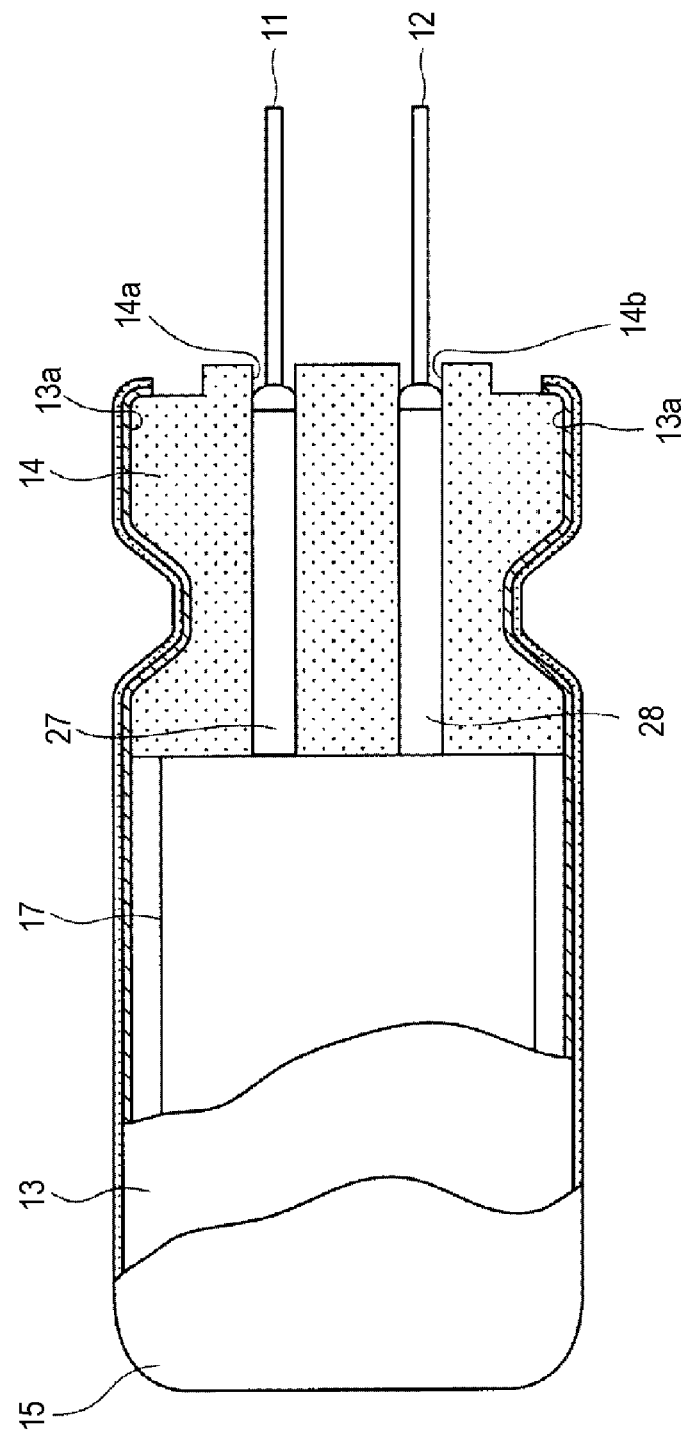
FIG. 8 is another cross-sectional view for illustration of the method of manufacturing an electrolytic capacitor according to the embodiment.

Next, as illustrated in the cross-sectional view of FIG. 8, the casing 13 is swaged at a spot close to the opening 13a to be dented, thereby fixing the sealing material 14 to the casing 13. While there may be a case of covering the casing 13 with the sleeve 15 for the purpose of polarity indication and the like, the sleeve 15 does not have to be provided.

Figure 9:
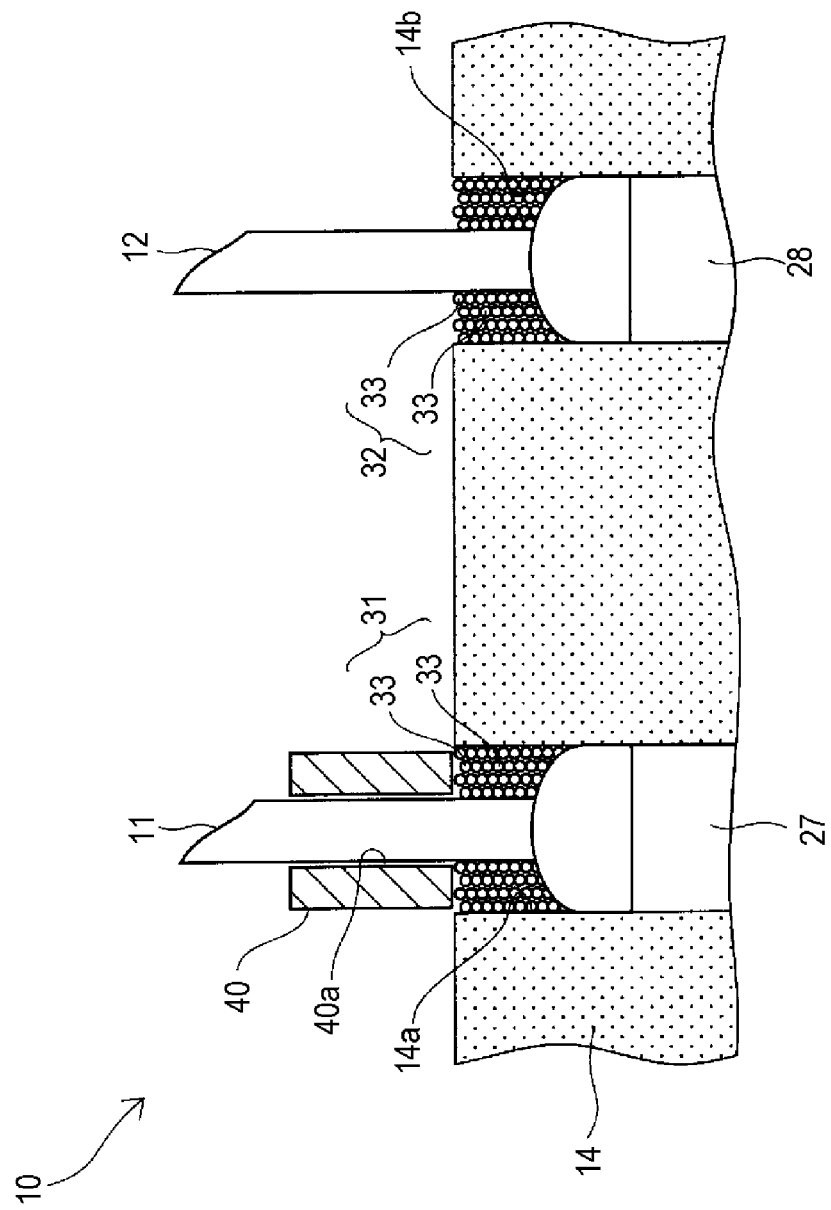
FIG. 9 is an enlarged cross-sectional view for illustration of the method of manufacturing an electrolytic capacitor according to the embodiment.

After that, as illustrated in the enlarged cross-sectional view of FIG. 9, the plurality of granules 33 are filled with each of the first hole 14a and the second hole 14b and these granules 33 are defined as the first and second fillers 31 and 32. As already described, it is preferred for the granules 33 to use granular rubber that has IIR same as the sealing material 14 as a material to inhibit volatile components from the granules 33.

Further, since each granule 33 is able to freely move in each of the holes 14a and 14b while being filled, each of the fillers 31 and 32, the sealing material 14, and each of the leads 11 and 12 do not have to be located and thus this procedure is simplified.

When the granules 33 are filled, it is preferred to push the granules 33 respectively into the first hole 14a and the second hole 14b using a jig 40. The jig 40 has an opening 40a to let the first lead 11 and the second lead 12 through and the jig 40 has an outer diameter narrower than an inner diameter of the first hole 14a and the second hole 14b, respectively.

Using such jig 40 presses the granules 33 against the inner surfaces of the first hole 14a and the second hole 14b, which makes it difficult to drop the granules 33 out of these holes 14a and 14b.

In particular, since the granular rubber used as the granules 33 is highly flexible, it is possible to reduce a risk that the capacitance portion 17 (refer to FIG. 3) and the respective leads 11 and 12 are subjected to mechanical stress when the granules 33 are filled in such a manner.

The basic structure of the electrolytic capacitor 10 according to the embodiment is thus completed.

The embodiment enables to avoid scattering of the whisker W by the first and second fillers 31 and 32, so that it is possible to reduce a risk of electrically connecting terminals of other electronic components on the circuit board to each other by the whisker W. Therefore, using this electrolytic capacitor 10 for a power supply circuit and a peripheral circuit of a CPU enables to enhance the reliability of these circuits.

As the sealing material 14 and the first and second leads 11 and 12, it is possible to use readymade products that are widely spread in general and it does not have to use custom made products as these members, so that mass production of electrolytic capacitor 10 is facilitated.

Further, the procedure to fill the first hole 14a and the like with the first filler 31 (refer to FIG. 9) is possible not only for electrolytic capacitor manufacturers but also for manufacturers of a circuit board having an electrolytic capacitor implemented therein, which extends approaches for the embodiment.

Although a non-solid aluminum electrolytic capacitor using an electrolyte solution has been described in the embodiment, the embodiment is not limited to this. For example, the embodiment is applicable to a solid aluminum electrolytic capacitor in which a conductive polyelectrolyte with a structure similar to above is impregnated for polymerization and the like.

Other Embodiments

In the above description, the aggregate of the insulating granules 33 are employed for the first and second fillers 31 and 32. Instead, insulating foam rubber provided with a space therein may also be employed for the first and second fillers 31 and 32.

Figure 10:
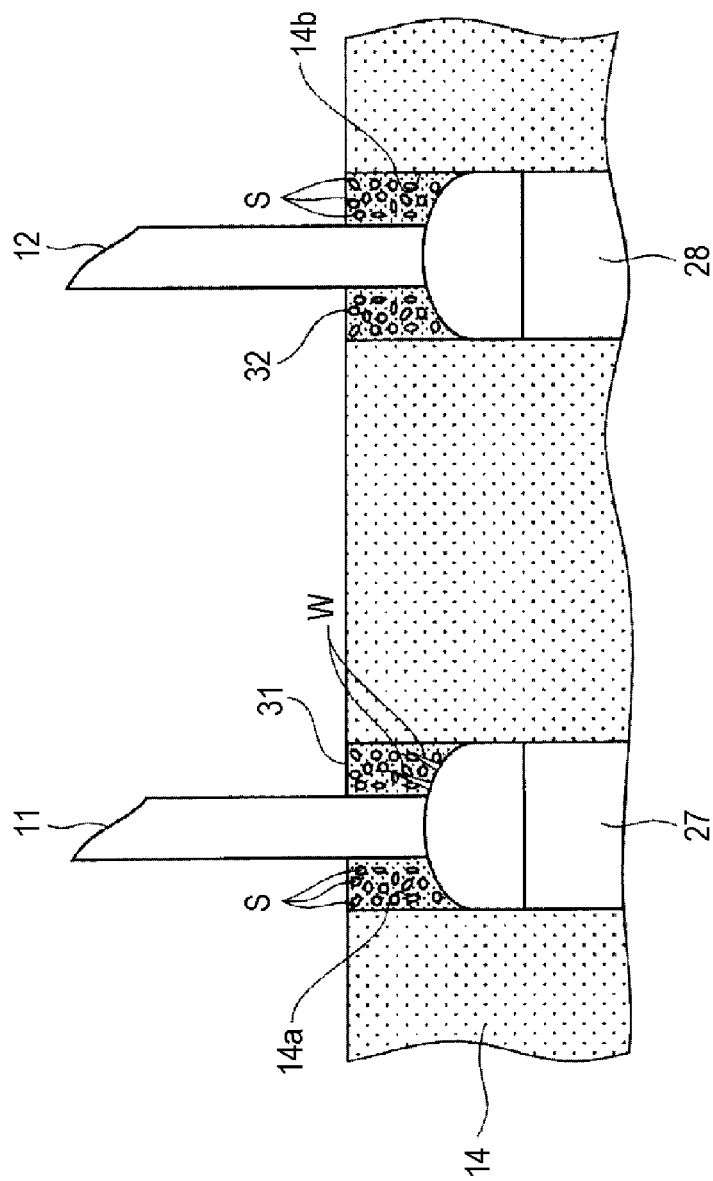
FIG. 10 is an enlarged cross-sectional view of an electrolytic capacitor in a case of using insulating foam rubber as first and second fillers.

FIG. 10 is an enlarged cross-sectional view of the electrolytic capacitor 10 in a case of using insulating foam rubber as the first and second fillers 31 and 32. As such foam rubber, it is possible to use, for example, rubber obtained by mixing an organic foaming ingredient with synthetic rubber or the like.

In this case as well, it is possible to avoid the scattering of the whisker W by the first and second fillers 31 and 32. In addition, by cavities S in the foam rubber, it is also possible to let out a gas generated from the capacitance portion 17 while charging and discharging to outside via the cavities S in the foam rubber.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electrolytic capacitor comprising:
a capacitance portion that includes an anode foil and a cathode foil wound around, a separator being provided between the anode foil and the cathode foil;
a first conductor bar connected to the anode foil;
a second conductor bar connected to the cathode foil;
a casing that houses the capacitance portion, the first conductor bar, and the second conductor bar and is provided with an opening;
a sealing material fitted to the opening, the sealing material including a first hole and a second hole;
a first lead welded to the first conductor bar within the first hole forming a first welding portion;
a second lead welded to the second conductor bar the second hole forming a second welding portion;
a first insulating filler filled between the first hole and the first lead, and at least partially surrounding the first welding portion, wherein the first insulating filler being formed in a porous state having air permeability; and
a second insulating filler filled between the second hole and the second lead, and at least partially surrounding the second welding portion, wherein the second insulating filler being formed in a porous state having air permeability.

2. The electrolytic capacitor according to claim 1, wherein the first filler and the second filler are an aggregate of a plurality of granules.

3. The electrolytic capacitor according to claim 2, wherein the granules are granular rubber.

4. The electrolytic capacitor according to claim 1, wherein the first filler and the second filler are foam rubber.

5. The electrolytic capacitor according to claim 1, wherein the sealing material, the first filler, and the second filler respectively have an identical material.

6. The electrolytic capacitor according to claim 1, wherein
the anode foil, the cathode foil, the first conductor bar, and the second conductor bar respectively are made of aluminum, and
the first lead and the second lead respectively have a surface formed of a low melting point metal layer.

7. A method of manufacturing an electrolytic capacitor, the method comprising:
welding a first conductor bar and a first lead forming a first welding portion;
welding a second conductor bar and a second lead forming a second welding portion;
forming a capacitance portion by winding an anode foil and a cathode foil around via a separator;
connecting the anode foil to the first conductor bar;
connecting the cathode foil to the second conductor bar;
housing the capacitance portion, the first conductor bar, and the second conductor bar in a casing that is provided with an opening;
fitting a sealing material that is formed with a first hole and a second hole to the opening of the casing and also letting the first lead and the second lead respectively go through the first hole and the second hole;
filling a first insulating filler so as to form a porous state having air permeability between the first hole and the first lead, and at least partially surrounding the first welding portion; and
filling a second insulating filler so as to form a porous state having air permeability between the second hole and the second lead, and at least partially surrounding the second welding portion.

8. The method of manufacturing an electrolytic capacitor according to claim 7, wherein an aggregate of a plurality of granules is employed for each of the first filler and the second filler.

9. The method of manufacturing an electrolytic capacitor according to claim 7, wherein foam rubber is employed for each of the first filler and the second filler.

10. The method of manufacturing an electrolytic capacitor according to claim 7, wherein
in the welding the first conductor bar and the first lead, the first conductor bar and the first lead are electrically welded, and
in the welding the second conductor bar and the second lead, the second conductor bar and the second lead are electrically welded.

* * * * *